(12) United States Patent
Chan

(10) Patent No.: US 7,634,746 B1
(45) Date of Patent: Dec. 15, 2009

(54) PROCESS CORNER ESTIMATION CIRCUIT WITH TEMPERATURE COMPENSATION

(75) Inventor: Wai Cheong Chan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 514 days.

(21) Appl. No.: 11/508,684

(22) Filed: Aug. 23, 2006

Related U.S. Application Data

(63) Continuation-in-part of application No. 11/272,928, filed on Nov. 14, 2005.

(51) Int. Cl.
G06F 17/50 (2006.01)
G05F 1/00 (2006.01)
H01L 35/00 (2006.01)

(52) U.S. Cl. .................. 716/4; 716/6; 323/274; 327/513

(58) Field of Classification Search .......... 716/2, 716/4, 6; 327/100, 113, 175, 540, 543, 513; 323/274
See application file for complete search history.

(56) References Cited

U.S. PATENT DOCUMENTS

| | | | |
|---|---|---|---|
| 6,191,660 B1 * | 2/2001 | Mar et al. ............... | 331/111 |
| 6,480,127 B1 | 11/2002 | Aslan ...................... | 341/119 |
| 6,808,307 B1 | 10/2004 | Aslan et al. ............... | 374/178 |
| 6,874,933 B1 | 4/2005 | Chan ........................ | 374/171 |
| 6,930,526 B1 | 8/2005 | Silva ....................... | 327/175 |
| 6,930,542 B1 | 8/2005 | Aude ....................... | 327/543 |
| 7,075,360 B1 * | 7/2006 | Holloway et al. .......... | 327/543 |
| 7,332,975 B2 * | 2/2008 | Marques ................... | 331/44 |
| 2005/0057230 A1 * | 3/2005 | Saha et al. ................ | 323/234 |
| 2005/0237104 A1 * | 10/2005 | Chou ....................... | 327/538 |

* cited by examiner

*Primary Examiner*—Stacy A Whitmore
(74) *Attorney, Agent, or Firm*—Dergosits & Noah LLP

(57) ABSTRACT

A process corner estimation circuit with temperature compensation is included in each die formed from a silicon wafer in order to quickly and easily provide a determination of process corner. The temperature compensation circuitry provides input current to a clock generator, the input current to the clock generator being inversely proportional to the temperature of the die. The clock generator circuit of the indicator circuit includes an array of flip-flop elements and is run at a lower operating voltage, such that the differences in delay in the generated timing signal are accentuated for different process corners. The period of the timing signal is determined using slow and fast clock counters, with the slow clock counting a number of cycles of the timing signal and the fast clock counting a number of cycles of a fixed frequency. The count produced by the fast clock corresponds to the delay in the clock generator circuit, giving a temperature compensated indication of the process corner of the die.

14 Claims, 10 Drawing Sheets

| FIG. 6A | FIG. 6B |

US 7,634,746 B1

PROCESS CORNER ESTIMATION CIRCUIT WITH TEMPERATURE COMPENSATION

RELATED APPLICATION

This application is a Continuation-In-Part of co-pending and commonly assigned U.S. application Ser. No. 11/272,928, filed on Nov. 14, 2005, by Wai Cheong Chan, titled "Process Corner Indicator and Estimation Circuit." application Ser. No. 11/272,928 is hereby incorporated by reference herein in its entirety.

TECHNICAL FIELD OF THE INVENTION

The present invention relates to performance analysis of integrated circuits and, in particular, to a circuit and method that includes a temperature compensation scheme for the determination of process corner information for integrated circuit die.

BACKGROUND

The design and manufacture of very large scale integration (VLSI) integrated circuit devices continue to become more complex and sophisticated. Current VLSI technology allows for the design and manufacture of large-area integrated circuits with sub-micron feature sizes, such that millions of devices can be placed on a single chip. Even using the highest level of control in state-of-the-art technology, a fabrication process only provides control of transistor characteristics to a given range, generally a Gaussian distribution, and is not able to provide precise control to specific characteristic values. Such process gradients occur not only within a single batch of wafers, but exhibit themselves across a single wafer as well. VLSI design libraries typically are characterized using the extremes of the process distribution, referred to in the industry as the "slow" and "fast" process corners. A "typical" process corner corresponding to the center of the process distribution is also often provided.

Ideally, it would be desirable to know the process corner for each individual die on a wafer. Since it is currently impractical to obtain such knowledge in large-scale device manufacture, VLSI design addresses the worst operating conditions, or slow process corner. By choosing a design for the slow process corner, circuit designers can be sure that the typical and fast process corners will still work with that single design. If the designers were to choose a design that was optimal for typical or fast process corners, then those die corresponding to slow process corners might not operate properly, resulting in lower yields and higher cost per device.

A downside to this approach, however, is that all die then operate as if they are from the slow process corner. If a particular die is not at the worst process corner, then the chip likely is operating at a lower frequency than is otherwise possible. Increasing the frequency would result in improving chip performance. The chip also may be operating at a higher voltage than is necessary to meet timing requirements, which results in unnecessary power usage. Unnecessary power usage is becoming an important issue as IC chips are increasingly used in portable devices that run from battery power.

Today, there are means available to adaptively adjust the operating needs of a chip regardless of the process corner of that chip. In one such process, an advanced process power controller is used to detect a slack in critical timing. If the critical path timing has not reached a maximum, the voltage can be lowered to provide power savings. This closed loop method requires characterization collaterals to make the approach work. Therefore, a simpler process that quickly and cheaply provides process corner information is desired.

Above-referenced related U.S. application Ser. No. 11/272,928 discloses process corner estimation circuit embodiments and methods that overcome deficiencies in conventional chip designing, testing and manufacturing processes by providing for simple determination of process corner information on a die-to-die basis. By determining the process corner of each die, such as a fast, typical or slow process corner, as discussed above, the performance of each die can be improved where possible, such as by running the die at a lower voltage or at a higher frequency.

It is well known that the delay of a standard integrated circuit is typically determined by the supply voltage, temperature and process corner of the circuit. As discussed in above-referenced application Ser. No. 11/272,928, if two of the variables (e.g., supply voltage and temperature) are fixed, then the remaining variable (process corner) can dictate the delay of a circuit. A digital code can be produced that represents the process corner on which a particular die falls, without the need for tedious bench measurements or other complicated procedures.

Referring to FIG. 1, application Ser. No. 11/272,928 discloses a circuit 100 that can be included on each individual die formed on a semiconductor wafer in order to provide an estimate of process corner information. The circuit 100 includes a clock generator circuit 102 for generating a timing signal. The clock generator circuit 102 is a free-running clock that can be started through application of a trigger voltage. The output frequency of a timing signal from the clock generator is directly proportional to the supply voltage (VDDL) and temperature. By applying a lower supply voltage, such as a voltage of about 0.6V for the exemplary 1.8V process, the frequency of the timing signal will be lower, such that the delay of each standard cell becomes "worse" and the period of the output (a quasi-square wave for a digital clock generator) is increased. As the period of the timing signal increases, the timing differences between the extreme process corners become accentuated. The period/frequency of the clock generator 102 at a particular voltage and a particular temperature then can be a good indication of the process corner for that particular die.

FIG. 2 shows period vs. voltage plots, at room temperature for a 0.18 μm process, for three different die, representing a slow process corner 200, a typical process corner 202 and a fast process corner 204. As can be seen, there is less separation between periods of the process corners at higher supply voltages (around 1.0V) than at lower supply voltages (around 0.6V). At higher voltages, such as at the 1.8V normal operating voltage, it would be difficult to make a distinction between process corners. A very high resolution process would be needed.

With reference to the FIG. 1 circuit 100, if the clock generator 102 can be run at 0.6V, for example, the separation between process corners is much more distinct. In this example, a slow process corner has a period of about 180 ns, while a typical process corner has a period of about 80 ns and a fast process corner has a period of about 30 ns. This large separation makes it easy to determine the process corner of a die.

The corner indicator circuit 100 shown in FIG. 1 can also measure the output timing of the clock generator circuit 102. Since the clock generator 102 is operating at a relatively low voltage, the output of the clock generator 102 can be passed through a level shifter 104. The level shifter 104 shifts the voltage level of the timing signal from the input level, 0.6V in this example, to the output level needed for the device counter, 1.8V in this example. As can be seen, the level shifter 104 takes as input both a low supply voltage (VDDL) and a high supply voltage (VDDH). The level shifted timing signal can be input into any appropriate counting device capable of measuring the period/frequency of the adjusted timing signal and generating an output signal in response thereto. In the FIG. 1 circuit 100, an output code logic block 106 includes a slow clock counter 108 and a fast clock counter 110. The slow clock counter 108 in this embodiment receives as input the high supply voltage (VDDH), the trigger/reset/enable signal (enb), and the level shifted timing signal received from the level shifter 104. The slow clock counter 108 counts a number of cycles, such as 10 cycles, of the level shifted timing signal. For a slow process corner at room temperature with a 0.6V supply voltage, the period of the timing signal should be about 180 ns, as discussed above with respect to FIG. 2. After counting 10 cycles (corresponding to 1800 ns), or the selected number of cycles to be counted, the slow clock counter 108 can generate a flag, or hold signal. This hold signal can be input into the fast clock counter 110.

The fast clock counter 110 receives as input the same trigger signal (enb) that is supplied to the clock generator 102 and the slow clock counter 108. The fast clock counter 110 also receives a fast clock signal, in this example shown to be a 100 MHz clock signal. While the slow counter 108 counts the (level adjusted) output pulses from the clock generator 102, the fast clock counter 110 counts based on the 100 MHz fast clock signal (clk_in). In this example, each clocked cycle will take 10 ns. As discussed above, the slow clock counter 108 outputs a hold signal after 10 cycles of the timing signal, or after about 1800 ns. This hold signal is input to the fast clock counter 110, which will be caused to also stop at about 1800 ns after the trigger signal. Since the fast clock counter 110 is running at 10 ns/cycle, the fast clock counter 110 will generate a count of 180 cycles. This value (180) corresponds to the period of the timing signal output from the clock generator 102 for this particular die, and is a digital count of the period without the need for a frequency counter or any other element.

The clock signal selected (here 100 MHz) can be based on a simple relationship, such that the cycle count (pd_out) output by the fast clock counter 110 corresponds to the period of the timing signal. The period of the fast clock signal can be set to an integer value, such as 10 ns, that corresponds to the number of counts, again 10, recorded by the slow clock counter 108. If the slow clock counter 108 is set to count 20 cycles of the timing signal, the period of the fast clock signal can be set to 20 ns (50 MHz). By matching the period of the fast clock signal to the number of counts of the slow clock counter 108, the output of the fast clock counter 110 can correspond to the period of the timing signal, which can provide an immediate indication of the process corner for the die by identifying that value on the plot of FIG. 2. It should be understood that the output signal can be input to any circuit or device capable of receiving this signal and generating a signal in response thereto that is an indication of the process corner of that die. This indication can be used to adjust the operating conditions of the die, such that the die can be run at a faster speed or at a lower voltage where appropriate.

In the above-cited application Ser. No. 11/272,928, the process information can be estimated by operating the circuit at a fixed voltage at a particular temperature. This implies that the determination must be performed prior to use of the circuit in its normal application, such as at test. The result is then stored in a non-volatile memory (or by some other conventional method). During normal circuit operation, the stored result is retrieved to determine the process corner in which the circuit actually lies. This is required because three variables (supply, temperature, process corner) affect the result for the circuit and temperature at the time of normal operation may not be known.

As discussed above, FIG. 2 shows the characteristics of the circuit at room temperature versus supply voltage. Depending upon the process corner, the result at, for example, 0.6V is very distinct among the extreme (slow and fast) process corners and the typical process corner. FIG. 3, however, shows that, for different temperatures, the result at the 0.6V of one process corner overlaps the result of another process corner for a different temperature. The result, for example, for slow process corner at "hot" can be interpreted as the result typical process corner at "cold." It is to be noted that, at low voltage operation (when the gate-source voltage of a transistor is comparable to the threshold voltage), the transistor delay has an inverse relationship with temperature; that is, as temperature increases, the delay is reduced. This is opposite to the typical characteristics at regular operating voltage, such as at 1.8V for the example process used in this description. This behavior is observed in that the clock period (which is dependent upon delay) is higher at "cold" that at "hot" temperature.

As discussed in greater detail below, the present invention provides a circuit that enables the determination of process corner information without the need to store the result by providing an integrated temperature compensation scheme. The temperature compensation scheme ensures that the result from the circuit is independent of temperature.

DETAILED DESCRIPTION OF THE INVENTION

Figure 4:
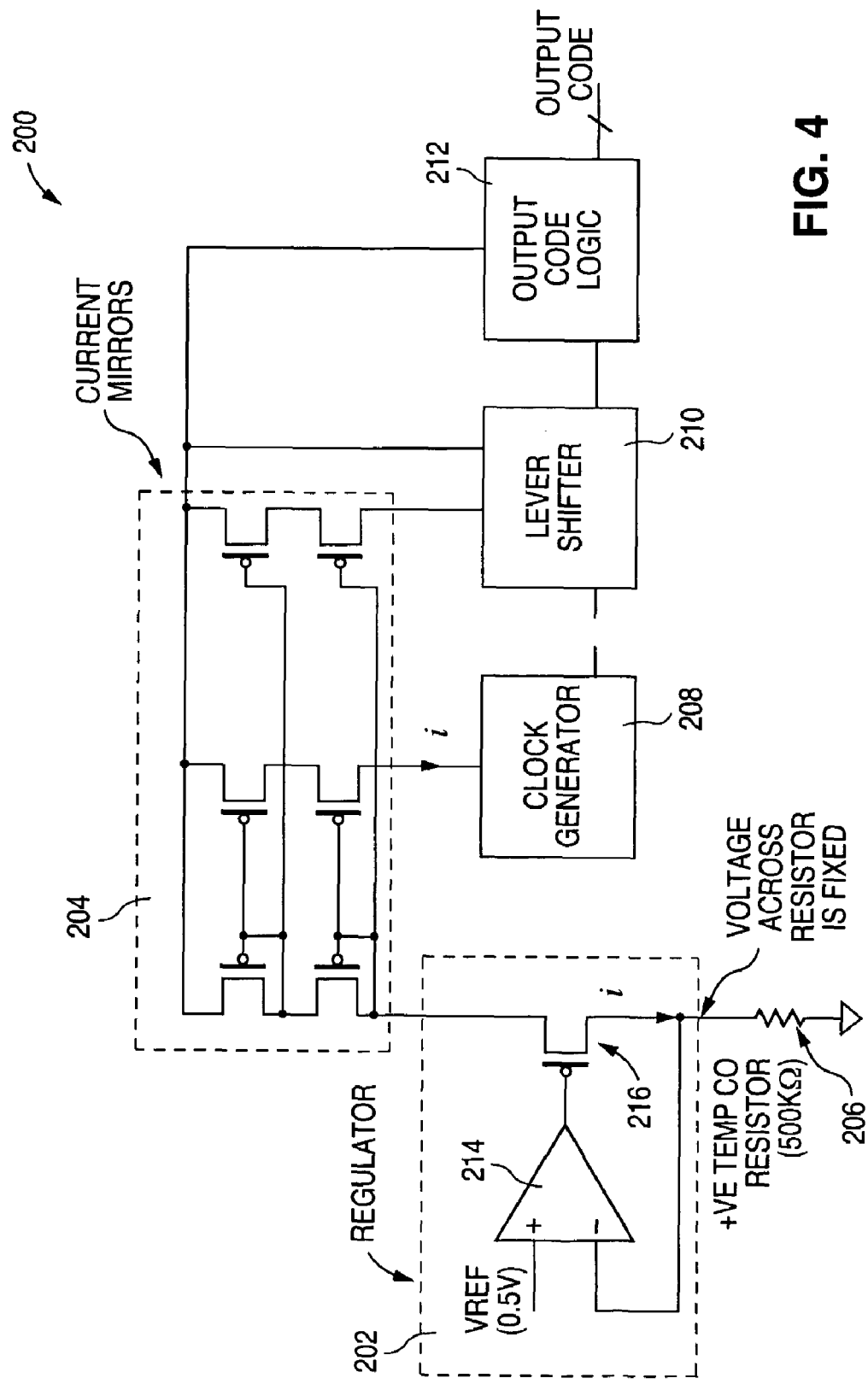
FIG. 4 shows a temperature compensated process corner indicator circuit in accordance with the concepts of the present invention.

FIG. 4 shows a process corner estimate circuit 200 with temperature compensation in accordance with the concepts of the present invention. The process corner estimate circuit 200 includes a regulator 202, current mirrors 204, a resistor 206 with positive temperature coefficient, a clock generator 208, a level shifter 210 and corner code output logic 212 comprising, as discussed below, a slow clock counter and a fast clock counter.

Figure 5:
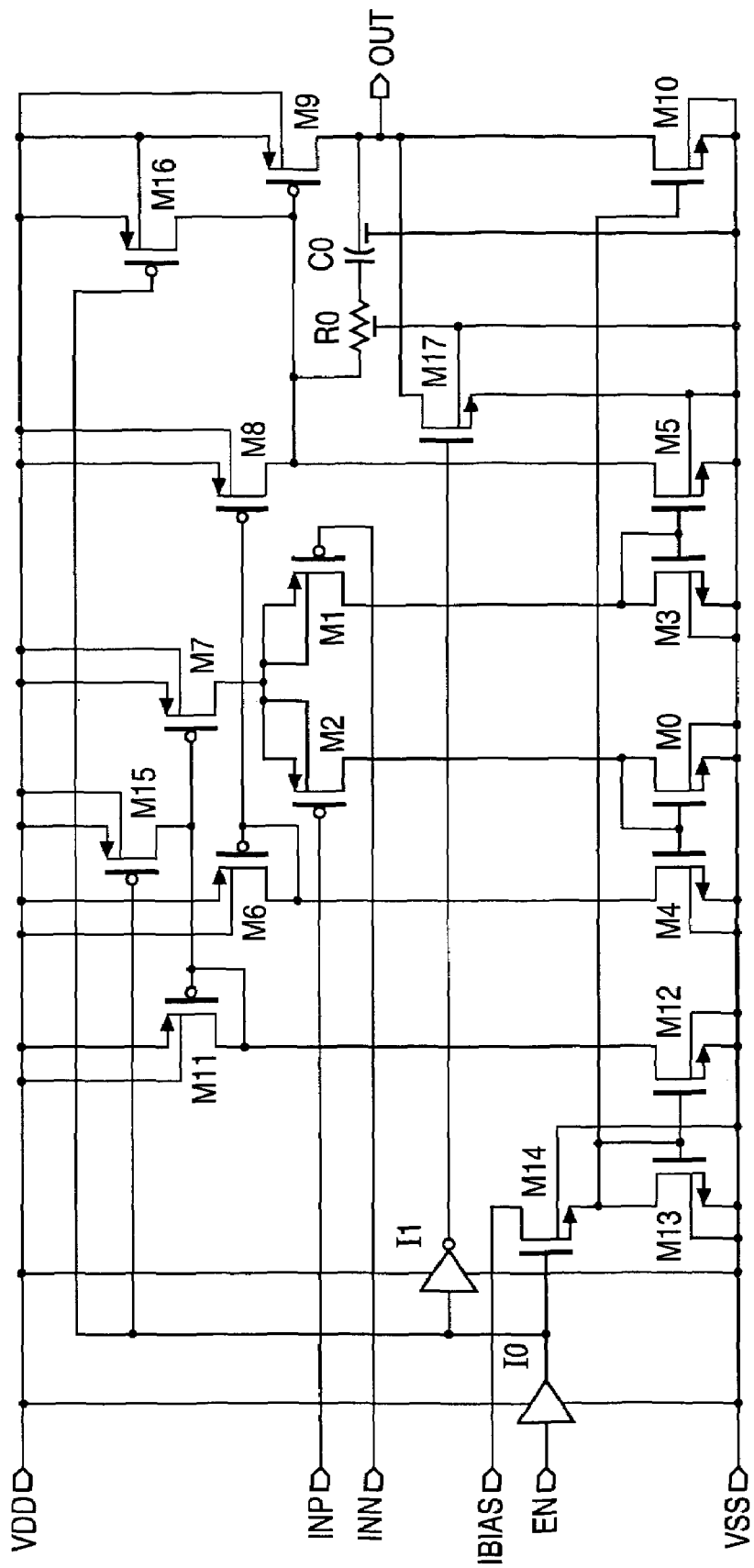
FIG. 5 shows an example of an operational amplifier circuit utilizable in the FIG. 4 temperature compensated process corner indicator circuit.

As shown in FIG. 4, the regulator circuit 202 includes an operational amplifier 214 and a transistor 216. The purpose of the regulator 202 is to fix the voltage across the resistor 206 to be the same as the reference voltage vref, shown as 0.5V in the FIG. 4 embodiment. The op-amp 214 can be any conventional op-amp circuit, an example of which is provided in FIG. 5.

A resistor 206 with positive temperature coefficient is used, the resistance thereby increasing with increase in temperature. Since, as discussed above, the voltage across the resistor 206 is fixed by the regulator circuit 202, the current through the resistor 206 decreases with increasing temperature. As shown on FIG. 4, the current mirrors 204 mirror the current i generated by the resistor 206 into the clock generator circuit 208 and the level shifter circuit 210. Thus, the input current i to the clock generator circuit 208 is inversely proportional to the temperature of integrated circuit die. Due to the current mirror circuit connection, there is about a two-threshold drop from the supply. Therefore, the clock generator circuit is under a low voltage operation. Moreover, the exact clock generator supply value is not significant in this configuration because it is the regulated current that controls the clock period. Now, as die temperature increases, since the current delivered to the clock circuit is reduced, the delay, and hence the clock period of output is increased. Similarly, as die temperature decreases, since the current delivered to the clock circuit is increased, the clock period output is made smaller. As a result of this current regulation, the clock period of the circuit 208 is maintained at a limited range for a particular process, even if the temperature is at the extremes.

Figures 6, 6A:
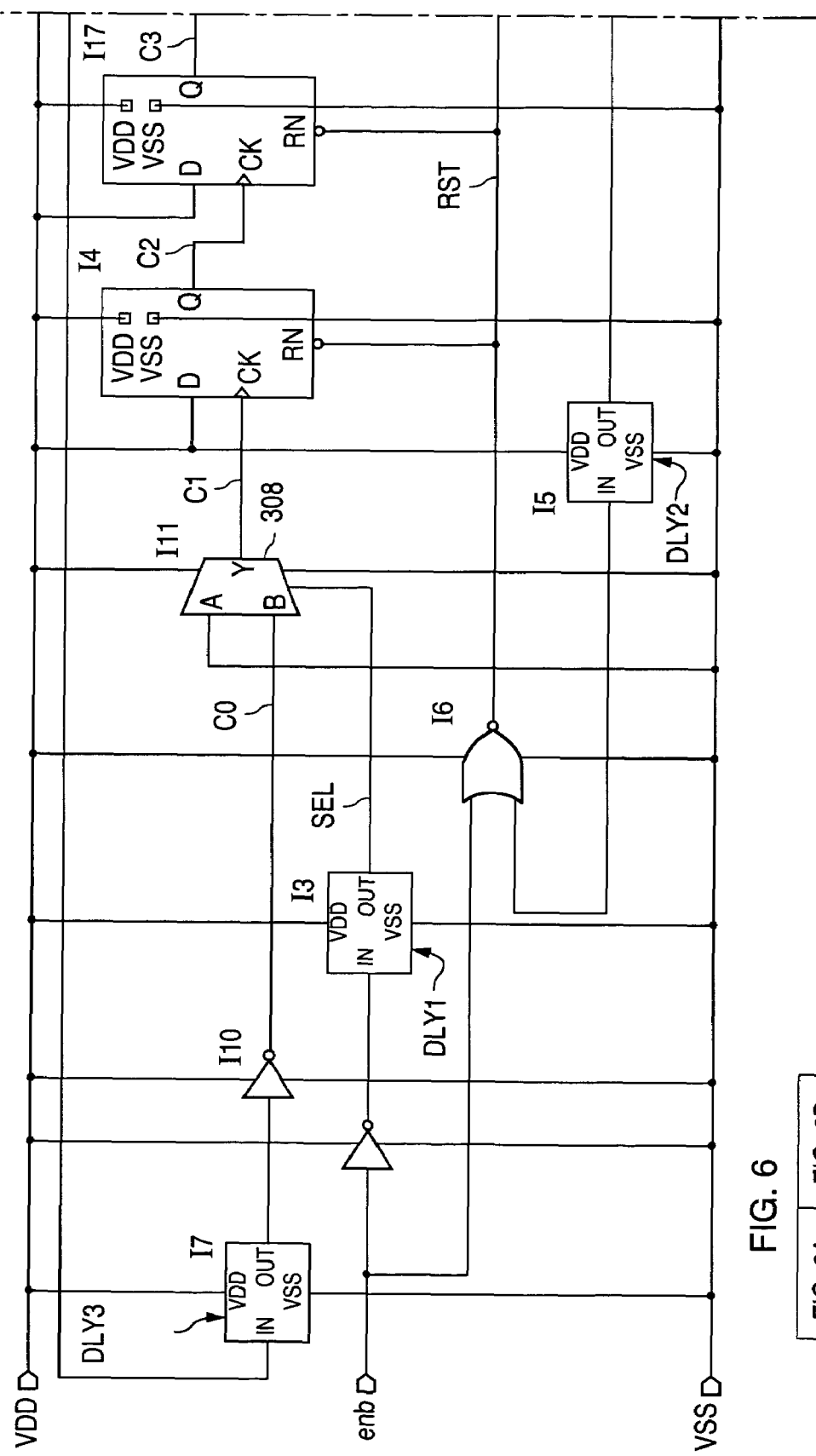
FIG. 6 shows a clock generator circuit that can be used in the FIG. 4 circuit.
Figure 6B:
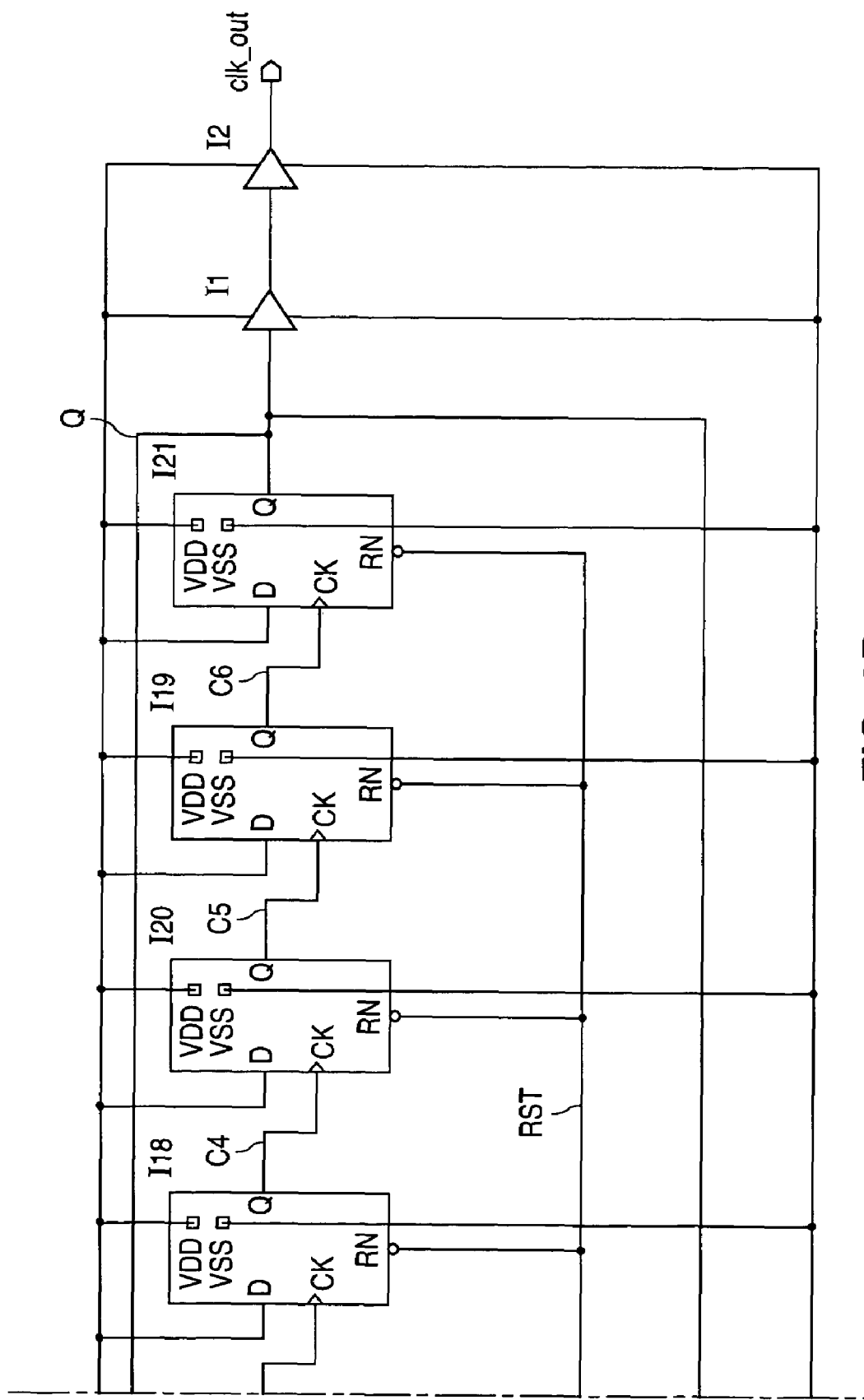

FIG. 6 shows an exemplary clock generator circuit 300 that can be used in the process corner estimate circuit 200 shown in FIG. 4. The basic operation of such a clock generator circuit 300 is disclosed in U.S. Pat. No. 6,874,933, which is hereby incorporated herein by reference. While such a circuit can have many components in common with the circuits described in U.S. Pat. No. 6,874,933, such as the inverters 302, delay elements 304, gates 306, and multiplexers 308 shown in FIG. 6 and discussed below with respect to FIG. 8, an advantage to a circuit such as the one shown in FIG. 6 is the inclusion of a series of flip-flop elements 310 (flip-flops). The period of the timing signal generated by such a circuit design is determined primarily by the delay of the components that make up the circuit, such that the inclusion of a series of flip-flop elements can provide a desirable amount of control over the period of the timing signal for different process corners as discussed below.

Such a clock generator circuit does not require complicated setup procedures, but instead can simply rely upon a trigger signal (enb) and a supply voltage. The clock generator circuit 300 can be used to generate a periodic pulse train, the period of the signal being dependent only on the process corner when the supply current is temperature compensated. When the trigger signal (enb) supplied to this circuit is high, the circuit can be in a reset state and the clock generator (and counters) will not operate. In this case, the output timing signal (clk_out) is in a low state. When the trigger signal (enb) goes low, the clock generator (and counters) can begin a free running state, whereby the periodic timing signal (clk_out) is generated.

Figure 1:
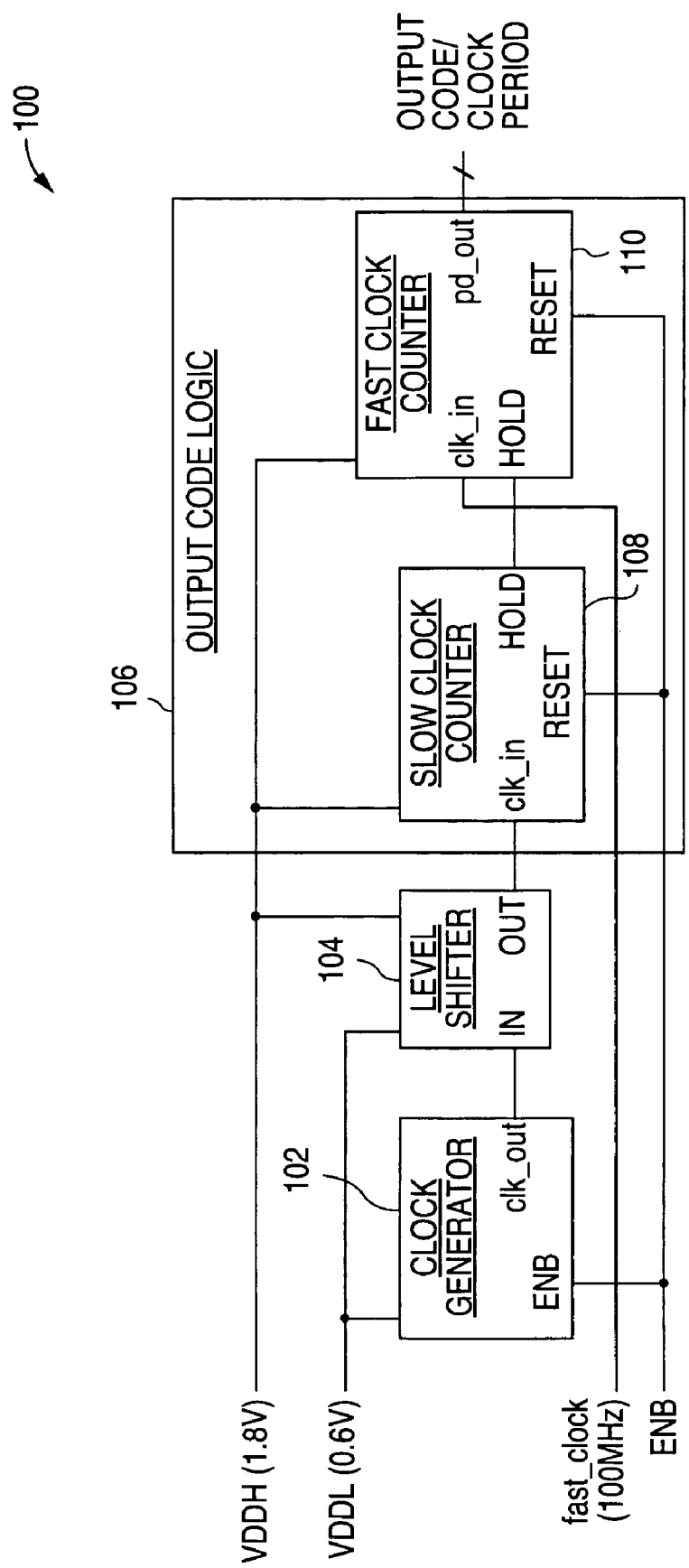
FIG. 1 shows a corner indicator circuit that can be used to determine the process corner of a die.
Figure 2:
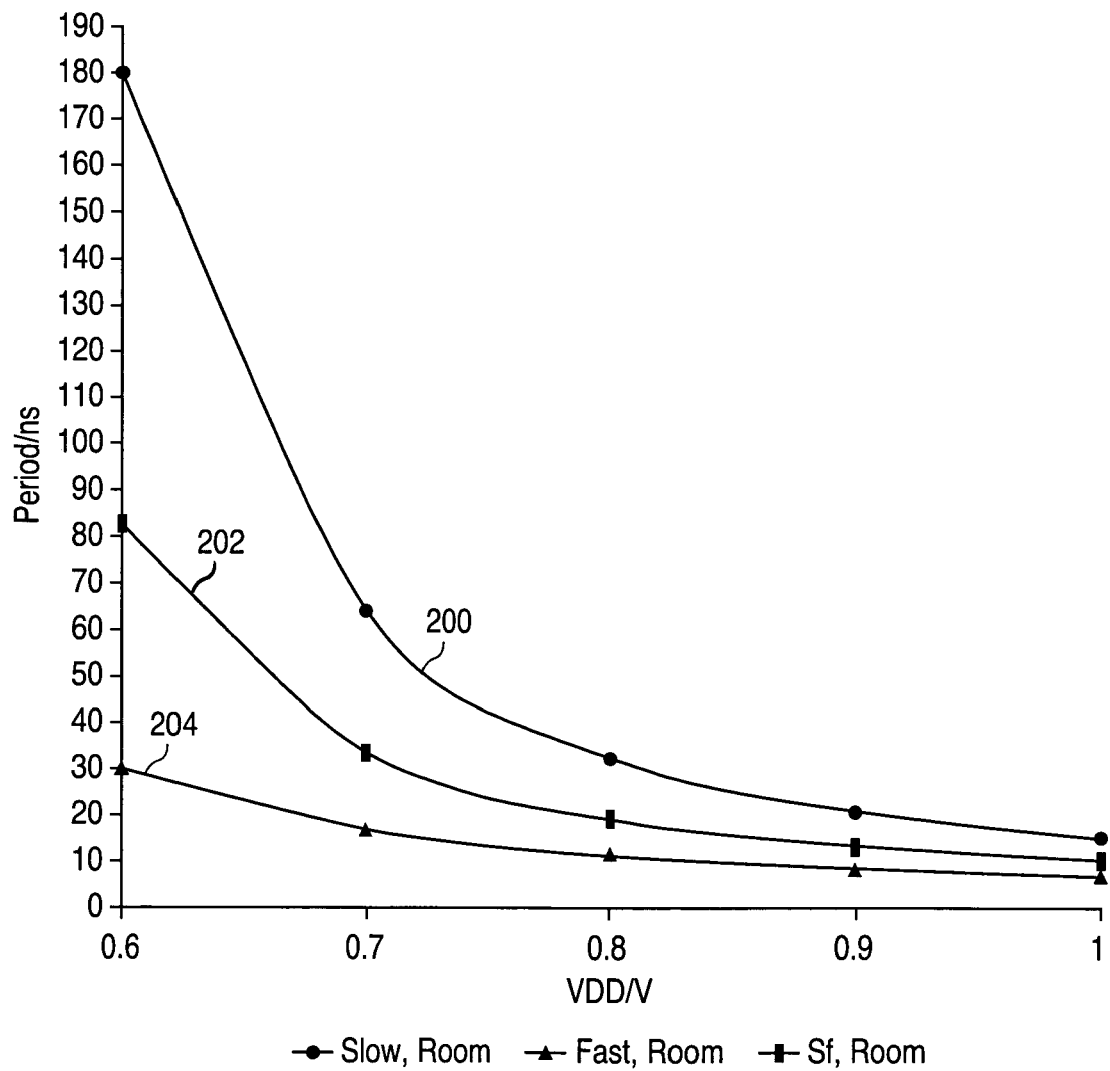
FIG. 2 is a plot showing the characteristics of the FIG. 1 corner indicator circuit at room temperature versus supply voltage.
Figure 3:
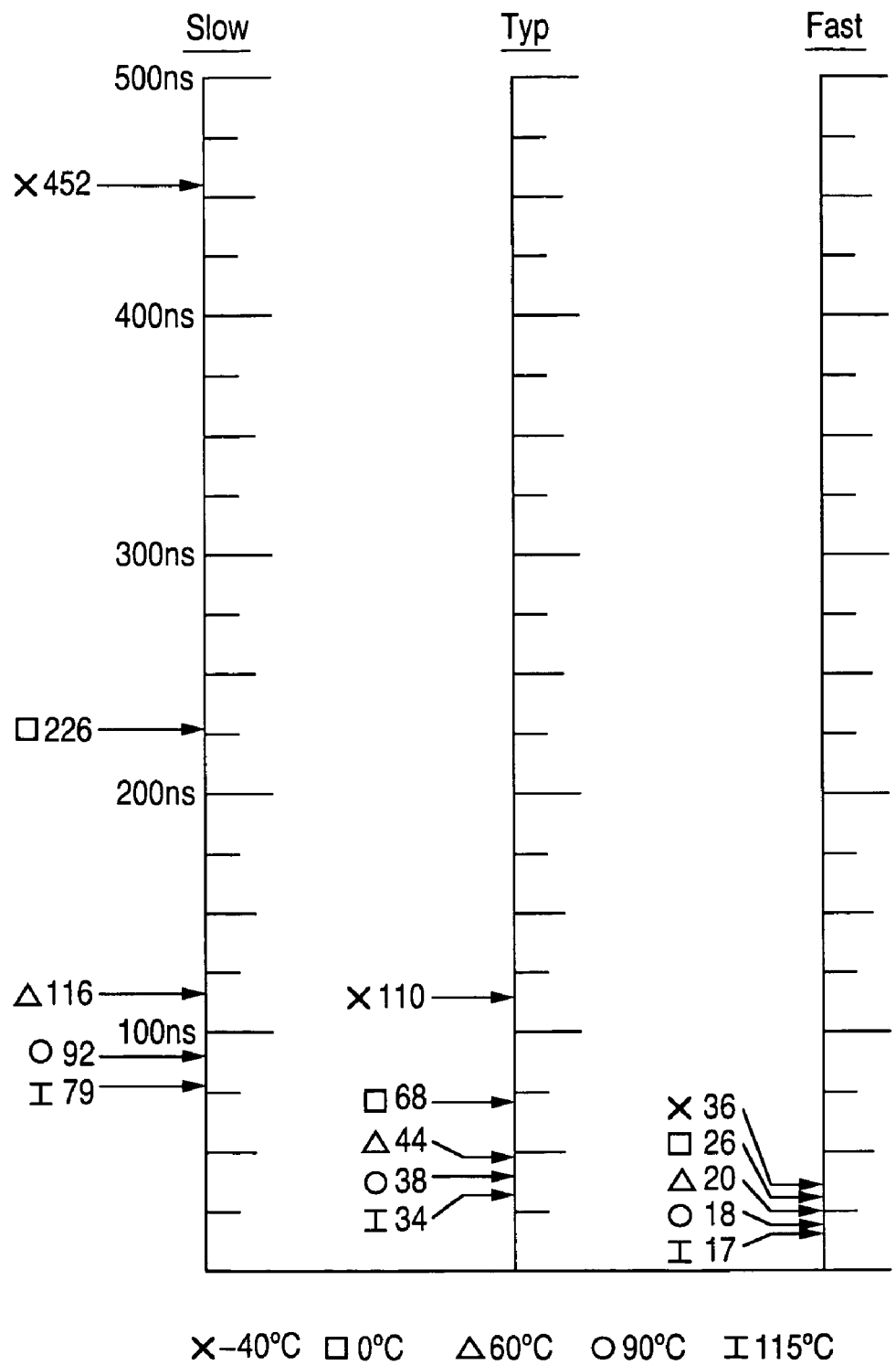
FIG. 3 shows the potential overlap of process corner for varying temperature.

A significant advantage of the clock generator circuit 300 in this embodiment is the increase sensitivity in delay with supply voltage. One reason for this sensitivity is the use of flip-flop elements in the clock generator circuit as discussed above. Flip-flops provide an advantage because the clock-to-Q delay of a flip-flop degrades much faster than other commonly used delay elements (such as NAND gates or buffers). Other delay elements tend not to degrade as drastically when supply voltage is decreased. While NAND gates were found to show a smaller separation, even at low voltages, flip-flops were found to show a drastic separation, such as is shown in FIG. 2. There is a limit to how low the voltage can go, however, as each circuit has a limit to what that particular technology can support.

Figure 7:
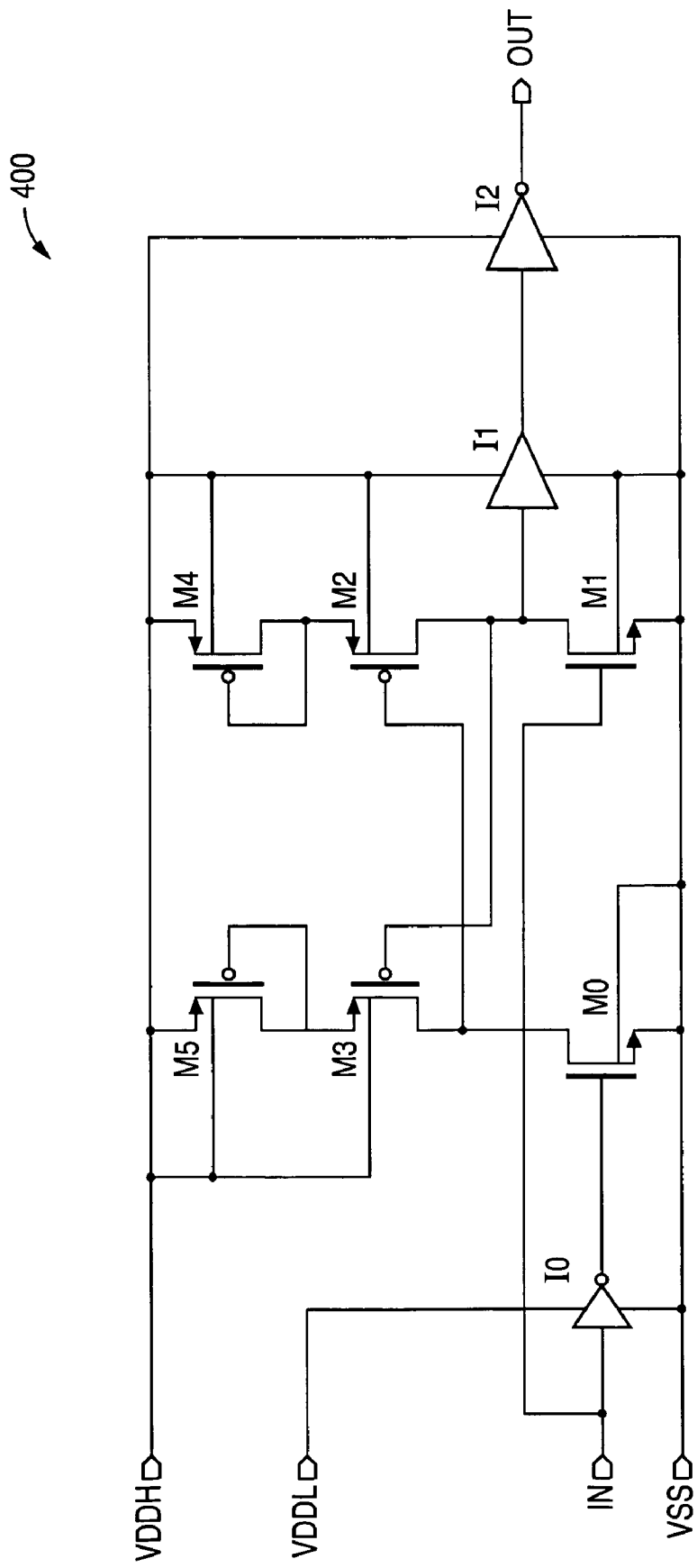
FIG. 7 shows a level shifting circuit that can be used in the FIG. 4 circuit.

FIG. 7 shows an exemplary level shifting circuit 400 that can be used in the circuit 200 of FIG. 4. The level shifting circuit can be any appropriate level shifting circuit known in the art for shifting a signal from a relatively low voltage level to a relatively high voltage level, and as such will not be described herein in detail. As seen in the diagram, the level shifting circuit receives the timing signal (in), as well as high (VDDH) and low (VDDL) supply voltages and a reference voltage (VSS). The circuit can increase the voltage level of the timing signal without introducing any error in the timing signal.

Figure 8:
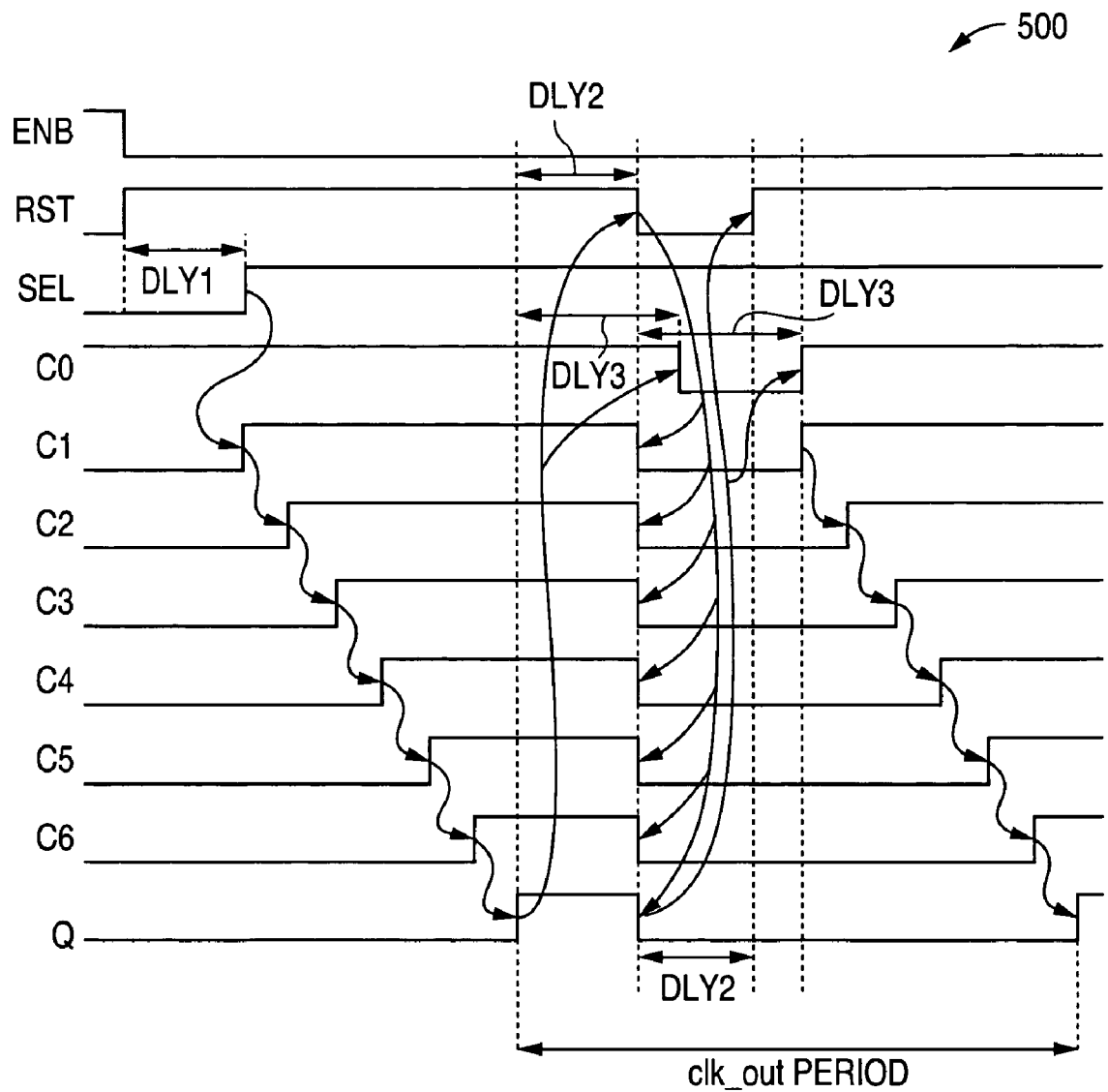
FIG. 8 shows a timing diagram for the FIG. 6 clock generator circuit.

FIG. 8 shows a timing diagram 500 for the generation of periodic pulses by a clock generator circuit, such as the circuit 300 of FIG. 6. The trigger/enable (enb) voltage can initially be set to a "high" value that is appropriate for such a circuit. This high enb value can reset the flip-flops, and the output of the multiplexer (signal C1) can be selected from input 0, which can be tied low. Since all flip-flops are in reset the output is low, which pre-conditions C0 to a high value. When signal enb switches to an appropriate "low" value, the reset voltage to the flip-flops is removed. After a delay (DLY1), signal SEL switches high. This causes C1 to go high by providing a rising edge to the first flip-flop, thereby switching the output of the first flip-flop (C2) to high. Since the input ports of all the flip-flops are tied high, the output of the second flip-flop (C3) can also switch high, after the clock-to-output delay. This process can continue until the output of the last flip-flop Q changes state to high. Signal Q going high causes RST to become active, resetting all flip-flops after some delay (DLY2). This also causes C0 to change state to low after delay DLY3.

After signal Q goes low, signal RST can go back to the inactive state after delay DLY2. Since Q changes state, C0 switches from low to high (once more) after DLY3. This transition provides a rising edge to the clock port of the first flip-flop. The process then can repeat. The end result can be the generation of a pulsed train having a period determined by the various delay elements in the circuit.

As discussed above, the timing signal can be level-shifted before being handled by subsequent logic. The subsequent logic in one embodiment includes corner code logic that provides a digital output code approximately equal to the period of the clock generator circuit (in ns). As an example, if the period of the clock generator is 100 ns, then the corresponding code would be 8'h64 (or d'100).

In the corner code logic, a high value of Enb keeps the logic under reset. After triggering, the slow clock counter (a 4-bit counter would be appropriate for this example) increments on every cycle of the level-shifted timing signal until the counter reaches 10. A hold signal is then sent to the fast clock counter (an 8-bit counter would be appropriate for this example), which is synchronized with the slow clock counter. The 8-bit counter increments on every fast clock count (each cycle of a 100 MHz clock signal in this example) as long as the hold signal is low. When the hold signal goes high, indicating a 10-count period from the slow clock counter, the fast clock counter stops advancing. The value of the fast clock counter is then the desired output, as described above. Another measurement can be taken by toggling the Enb signal. The above description can be represented in equation form:

total elapse time to set the hold signal=clock period (ns)×10 total elapse time when the fast counter stops=output code×10 ns therefore, output code=clock period (in ns)

In this case, the output code matches the clock generator signal period in ns.

The clock frequency of the fast clock does not need to be 100 MHz. A lower frequency can be used as long as the period is an integer in ns. For example, a 50 MHz clock could be used; in this case, the slow clock counter would need to accumulate up to 20 before asserting the hold signal (i.e., the above-provided equation would still apply).

Figure 9:
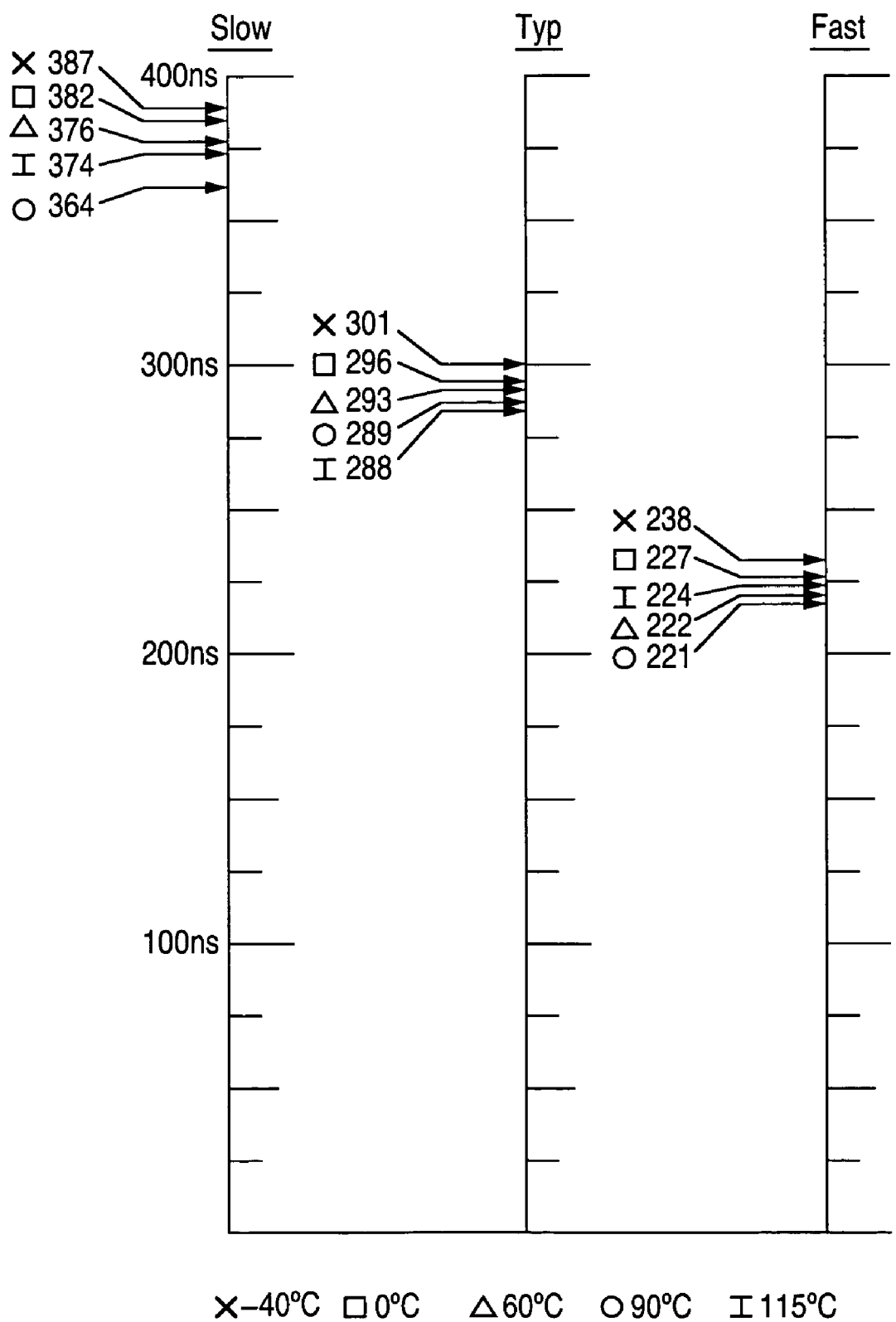
FIG. 9 is a plot showing the characteristics of the temperature compensated corner indicator circuit of FIG. 4.

By employing temperature compensation in a process corner estimation circuit as discussed above, the temperature spreading of the output period within a process corner can be tuned (by adjusting the resistor 206) to an acceptable narrow range. As can be seen from the simulation results provided in FIG. 9, the separation of output period from "slow" to "typical" process corner is about 60 ns; the separation for "typical" to "fast" is about 50 ns. Thus, the present invention provides sufficient margin for estimating process corner information. Also, it should be noted that this process corner clock period characteristic can be obtained from simulation (as shown in FIG. 9) or from silicon characterization before-hand.

In the earlier, above-cited application Ser. No. 11/272,928, since the temperature during normal chip operation may not be known, the corner estimate circuit disclosed therein would be invoked once during test and the clock output result stored in a non-volatile memory. This result can then be retrieved during normal chip operation and compared with the process corner clock period characteristics to determine where in the process distribution the silicon of this particular chip lies. With the temperature compensated corner estimation circuit of the present invention, there is no requirement for any storage element in the circuit. Whenever the process information is needed, the corner estimation circuit is triggered into operation; the result can then be compared to the pre-characterization data to get the process information.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A temperature compensated process corner estimation circuit for determining an appropriate process corner from a distribution of possible process corners for a die including the process corner estimation circuit, the process corner estimation circuit comprising:
    a clock generator circuit operable in response to an input current to generate a timing signal, the frequency of the timing signal depending upon the determined process corner of the die;
    a logic module operable to receive the timing signal from the clock generator circuit and output a signal in response thereto that corresponds to the determined process corner of the die; and
    a regulator circuit that provides the input current to the clock generator circuit, the input current being inversely proportional to the temperature of the die, the regulator circuit including
        (i) an operational amplifier that receives a reference voltage at its positive input;
        (ii) an MOS transistor having its gate connected to receive the output of the operational amplifier;
        (iii) a resistor having a positive temperature coefficient connected between the MOS transistor and a negative supply voltage, whereby the voltage across the resistor is fixed and the current flowing through the resistor is inversely proportional to the temperature of the die; and
        (iv) a current mirror that mirrors the current flowing through the resistor to the clock generator as the input current to the clock generator.

2. A process corner estimation circuit as in claim 1, and wherein:
    the clock generator circuit is operated at a lower supply voltage than the operating supply voltage of the die, thereby reducing the frequency of the timing signal.

3. A process corner estimation circuit as in claim 2, and further comprising:
    a level shifting circuit operable to level shift the timing signal from the lower supply voltage to the operating supply voltage.

4. A process corner estimation circuit as claim 1, and wherein:
    the clock generator circuit includes a plurality of flip-flop elements configured to increase differences in the frequency of the timing signal across the distribution of process corners.

5. A process corner estimation circuit as in claim 1, and wherein:
    the logic module includes a slow clock counter operable to receive the timing signal from the clock generator circuit, the slow clock counter operable to count a predetermined number of cycles of the timing signal and output a hold signal in response thereto.

6. A process corner estimation circuit as in claim 5, and wherein:
    the logic module further includes a fast clock counter operable to receive a fast frequency signal having a predetermined frequency, the fast clock counter operable to count a number of cycles of the fast frequency signal until the hold signal is received from the slow clock counter, and output a period count signal in response thereto.

7. A process corner estimation circuit as in claim 6, and further comprising:
    a trigger voltage source operable to switch a trigger voltage from a first voltage level to a second voltage level in order to start the indicator circuit.

8. A method for determining the process corner of a die using a process corner indicator circuit contained on the die, comprising the steps of:
    generating a periodic timing signal using a clock generator circuit in the process corner indicator circuit;
    providing temperature compensation to the clock generator circuit;
    determining the period of the periodic timing signal;

using the period to determine the process corner of the die; and selecting a lower supply voltage for the clock generator circuit than the normal operating supply voltage for the die, whereby the period of the timing signal is increased.

9. A method as in claim 8, and further comprising:

level shifting the timing signal from the lower supply voltage to the operating supply voltage.

10. A method as in claim 8, and further comprising:

providing a plurality of flip-flop elements configured to increase differences in the period of the timing signal between various process corners.

11. A method as in claim 8, and further comprising:

sending a trigger signal to the process corner indicator circuit in order to activate the process corner indicator circuit.

12. A method as in claim 8, and wherein:

determining the period of the periodic timing signal includes receiving the timing signal to a slow clock counter operable to count a predetermined number of cycles of the timing signal and output a hold signal in response thereto.

13. A method as in claim 12, and wherein:

determining the period of the periodic timing signal further includes receiving a fast frequency signal having a predetermined frequency to a fast clock counter operable, the fast clock counter operable to count a number of cycles of the fast frequency signal until the hold signal is received from the slow clock counter, and output a period count signal in response thereto.

14. A temperature compensated process corner estimation circuit for determining an appropriate process corner from a distribution of possible process corners for a die that includes the process corner estimation circuit, comprising:

a clock generator circuit that responds to an input signal to generate a timing signal, the frequency of the timing signal depending upon the process corner of the die, the clock generator circuit being operated at a lower supply voltage than the operating supply voltage of the die and including a plurality of flip-flop elements, thereby increasing differences in the frequency of the timing signal between process corners across the process corner distribution;

a temperature compensation circuit that generates the input signal, the input signal being inversely proportional to the temperature of the die;

a slow clock counter operable to receive the timing signal from the clock generator circuit, the slow clock counter operable to count a predetermined number of cycles of the timing signal and output a hold signal in response thereto; and a fast clock counter operable to receive a fast frequency signal having a predetermined frequency, the fast clock counter operable to count a number of cycles of the fast frequency signal until the hold signal is received from the slow clock counter, and output a period count signal in response thereto.

* * * * *